US007512617B2

(12) United States Patent
Lock et al.

(10) Patent No.: US 7,512,617 B2
(45) Date of Patent: Mar. 31, 2009

(54) INTERVAL TREE FOR IDENTIFYING INTERVALS THAT INTERSECT WITH A QUERY INTERVAL

(75) Inventors: Hendrick C. R. Lock, Dettenheim (DE); Daniel Booss, Wiesloch (DE)

(73) Assignee: Sap Aktiengesellschaft, Walldorf (DE)

( * ) Notice: Subject to any disclaimer, the term of this patent is extended or adjusted under 35 U.S.C. 154(b) by 385 days.

(21) Appl. No.: 11/026,359

(22) Filed: Dec. 29, 2004

(65) Prior Publication Data

US 2006/0143206 A1     Jun. 29, 2006

(51) Int. Cl.
*G06F 17/30* (2006.01)

(52) U.S. Cl. ............................ 707/101; 707/1; 707/100; 707/200

(58) Field of Classification Search ............ 707/1, 707/100, 101, 200
See application file for complete search history.

(56) References Cited

U.S. PATENT DOCUMENTS

| 5,724,605 | A | | 3/1998 | Wissner |
| 5,758,356 | A | * | 5/1998 | Hara et al. ............... 707/202 |
| 5,778,371 | A | * | 7/1998 | Fujihara ................... 707/100 |
| 5,864,867 | A | * | 1/1999 | Krusche et al. ......... 707/104.1 |
| 5,940,833 | A | * | 8/1999 | Benson .................... 707/100 |
| 6,219,667 | B1 | * | 4/2001 | Lu et al. ..................... 707/9 |
| 6,282,533 | B1 | * | 8/2001 | Ramaswamy et al. ......... 707/2 |
| 6,757,686 | B1 | * | 6/2004 | Syeda-Mahmood et al. . 707/100 |
| 7,007,030 | B2 | * | 2/2006 | Zibin et al. ............... 707/100 |
| 7,162,480 | B2 | * | 1/2007 | Vishik ....................... 707/101 |
| 2002/0123987 | A1 | | 9/2002 | Cox |
| 2003/0078935 | A1 | * | 4/2003 | Zibin et al. ............... 707/101 |
| 2004/0204978 | A1 | * | 10/2004 | Rayrole ...................... 705/8 |
| 2004/0210592 | A1 | * | 10/2004 | Ciolfi et al. .............. 707/101 |
| 2004/0230596 | A1 | * | 11/2004 | Veitch et al. ............. 707/101 |
| 2005/0050060 | A1 | * | 3/2005 | Damm et al. ............. 707/100 |
| 2005/0071322 | A1 | * | 3/2005 | Chen et al. .................. 707/3 |
| 2005/0198008 | A1 | * | 9/2005 | Adler ........................... 707/3 |
| 2006/0026188 | A1 | * | 2/2006 | Najork et al. ............. 707/101 |
| 2006/0101045 | A1 | * | 5/2006 | Chen et al. ................ 707/101 |
| 2006/0129580 | A1 | * | 6/2006 | Haft et al. ................. 707/101 |
| 2006/0212462 | A1 | * | 9/2006 | Heller et al. .............. 707/101 |
| 2006/0282411 | A1 | * | 12/2006 | Fagin et al. ................... 707/3 |

OTHER PUBLICATIONS

Professor Roberto Tamassia, "Priority Search Trees—Part 1", Sem. II, 1992-1993, C.S. 252, Computational Geometry, Lecture 9, Mar. 8, 1993, Scribe: Dina Q Golding Karon, 9 pages.

Tolga Bozkaya,et al., "Indexing Valid Time Intervals", Paper, Computer Engineering and Science Department, Case Wenster Reserve University, 18 pages. publication date: 1998.

Hans-Peter Kriegel, et al., "Managing Intervals Efficiently in Object-Relational Databases", Proceedings of the 26th International Conference on Very Large Databases, Cairo, Egypt, 2000, 12 pages.

Chuan-Heng Ang, et al. "The interval B-tree", Elsevier Sciience B.V., Information Processing Letters 53, (1995) pp. 85-89.

* cited by examiner

*Primary Examiner*—Christian P. Chace
*Assistant Examiner*—Farhan M Syed
(74) *Attorney, Agent, or Firm*—Blakely, Sokoloff, Taylor & Zafman, LLP

(57) ABSTRACT

A method operable with a computing system is described for identifying which time interval keys within an interval tree intersect with a query interval. The method comprises accessing information from a node of the interval tree. The node comprises a time interval that identifies the earliest start time and latest end time amongst all time interval keys at or beneath the node within the interval tree. The method also comprises determining if one or more of the node's children have the potential to intersect a query interval based upon the time interval.

30 Claims, 5 Drawing Sheets

INTERVAL TREE FOR IDENTIFYING INTERVALS THAT INTERSECT WITH A QUERY INTERVAL

FIELD OF INVENTION

The field of invention relates generally to the software arts; and, more specifically, to an interval tree for identifying intervals that intersect with a query interval.

BACKGROUND

Index Structures

An index structure can be used to efficiently find any "key" amongst a group of keys by organizing the keys into a hierarchical "tree" of nodes. In practical implementations, a key often corresponds to substantive data or some kind of identifier or reference to substantive data. The scheme behind the tree's hierarchy (of which different types exist, such as, B-tree, B*-tree, Red Black, Quad and AVL) is typically aimed at reducing the number of individual accesses that need to be made in order to find the sought for key over the course of the search process.

Figure 1:
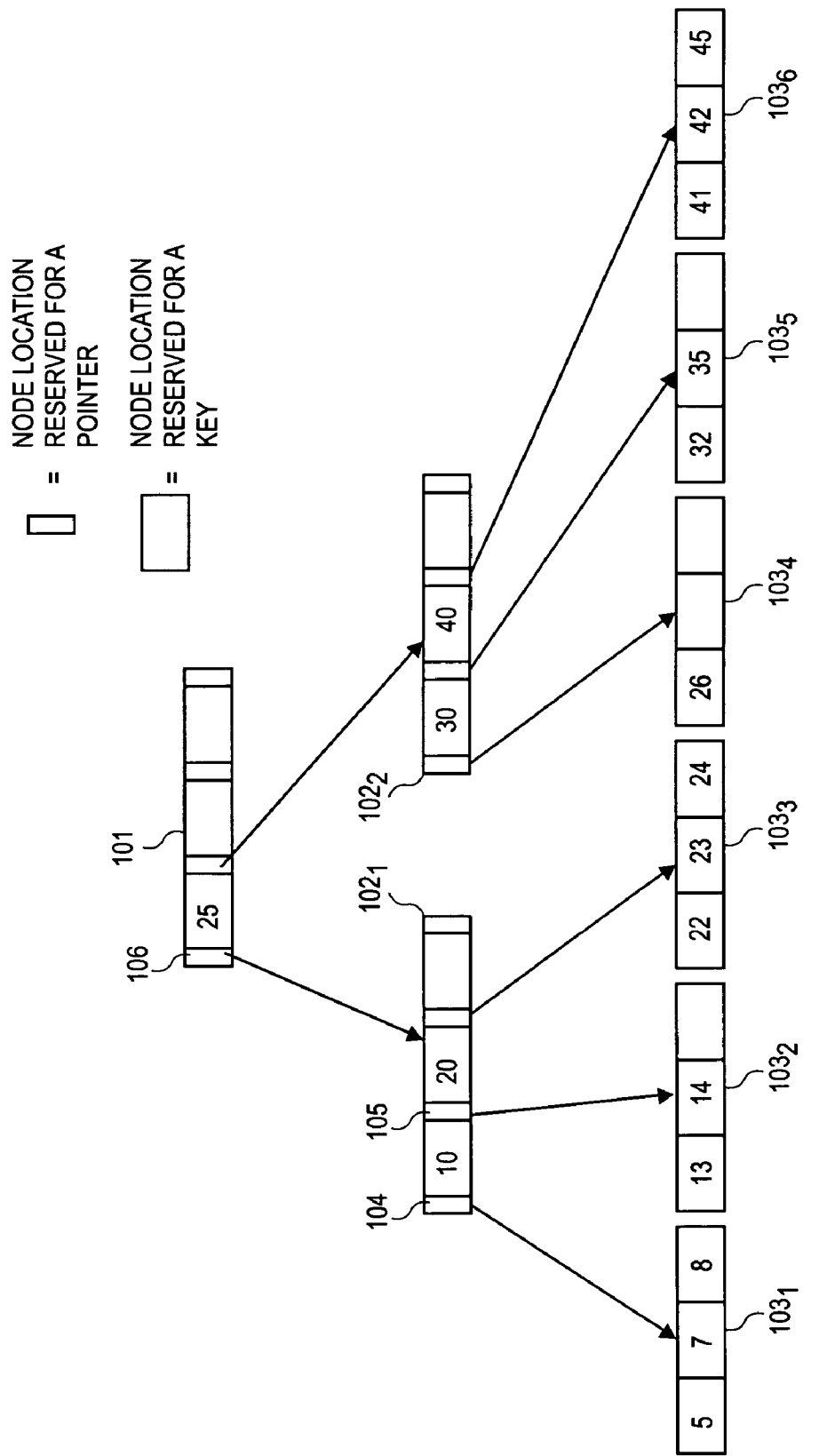

FIG. 1 shows an exemplary index structure 100 formatted according to a B-tree hierarchy. The nodes $103_1$ through $103_6$ at the lowest level in the tree 100 are typically referred to as "leaf" nodes and contain only keys. The highest node 101 in the tree 100 is referred to as the "root" node. The nodes $102_1$, $102_2$ between the root node 101 and the leaf nodes $103_1$ through $103_6$ may be referred to as "index" nodes.

The root node and index nodes of a index structure often contain a mixture of keys and pointers. A pointer located in an index node that resides just above a leaf node points to a leaf node that stems from the intermediate node. For example, referring to the exemplary tree of FIG. 1, pointer 104 points to leaf node $103_1$ and pointer 105 points to leaf node $103_2$. A pointer located in the root node (or an index node located higher in the tree than just above a leaf node) points to a sub-tree that stems from the node where pointer resides. For example, referring to the exemplary tree of FIG. 1, pointer 106 within root node 101 points to the sub-tree formed by nodes $102_1$, $103_1$, $103_2$ and $103_3$.

Note that according to a B-tree scheme, the tree is characterized by a parameter t (which is an integer greater than 1). The root node is capable of holding between 0 and 2t−1 keys inclusive. Each index node is capable of holding between t−1 and 2t−1 keys inclusive. Each index node has one more pointer than keys (i.e., if an index node has x keys it has x+1 pointers).

The B-tree 100 of FIG. 1 is a t=2 tree. Thus, the root node 101 and index nodes $102_1$, $102_2$ are each shown as having space available for three key values and four pointers. The leaf nodes $103_1$ through $103_6$ are each shown as having spaces for three key values. Only nodes $103_1$, $103_3$ and $103_6$ are fully populated.

In order to perform a search, the key value being searched for is first compared against the key values in the root node 101. If the searched for key value is not found in the root node, a particular pointer is identified based on the key value(s) observed in the root node. The process then repeats at the node that is pointed to by the identified pointer.

For example, in the index structure 100 observed in FIG. 1, if the searched for key value is less than 25, node $102_1$ will be searched next; or, if the searched for key value is greater than 25, node $102_2$ will be searched next. Searching is terminated once the searched for key is found and/or a leaf node is reached.

Scheduling

Certain software applications are designed to comprehend complicated scheduling tasks. For example, a supply-chain-management software application is typically designed to comprehend all of the resources in a supply chain (e.g., raw materials, manufacturing equipment, distribution, warehousing, etc.) and schedule their usages so that a specific "supply" of product can be provided at each of a number of different places at specific times. As the complexities of such scheduling tasks increases, efficient solutions for managing them are needed.

SUMMARY

A method operable with a computing system is described for identifying which time interval keys within an interval tree intersect with a query interval. The method comprises accessing information from a node of the interval tree. The node comprises a time interval that identifies the earliest start time and latest end time amongst all time interval keys at or beneath the node within the interval tree. The method also comprises determining if one or more of the node's children have the potential to intersect a query interval based upon the time interval.

FIGURES

Figure 2:
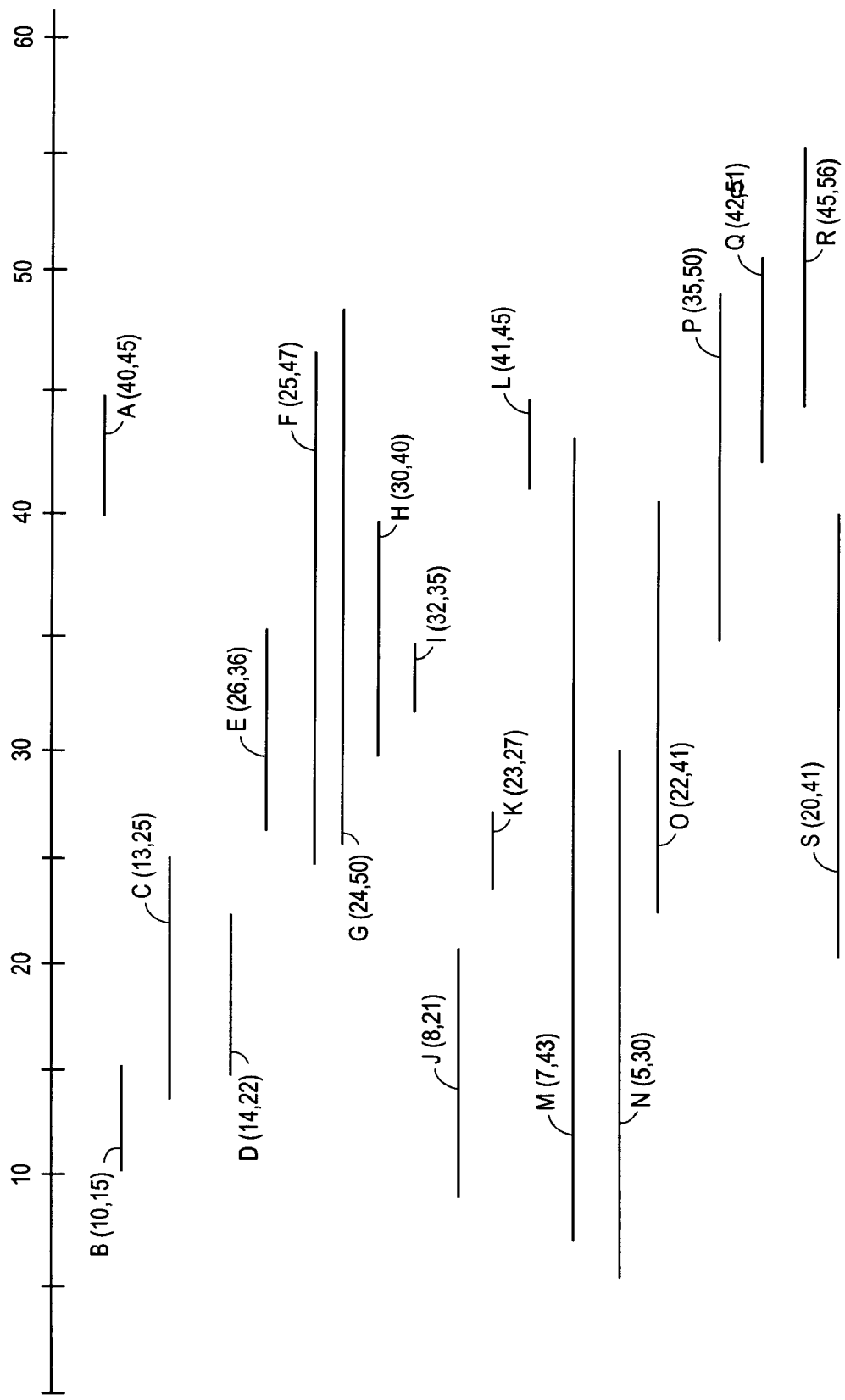
Figure 3:
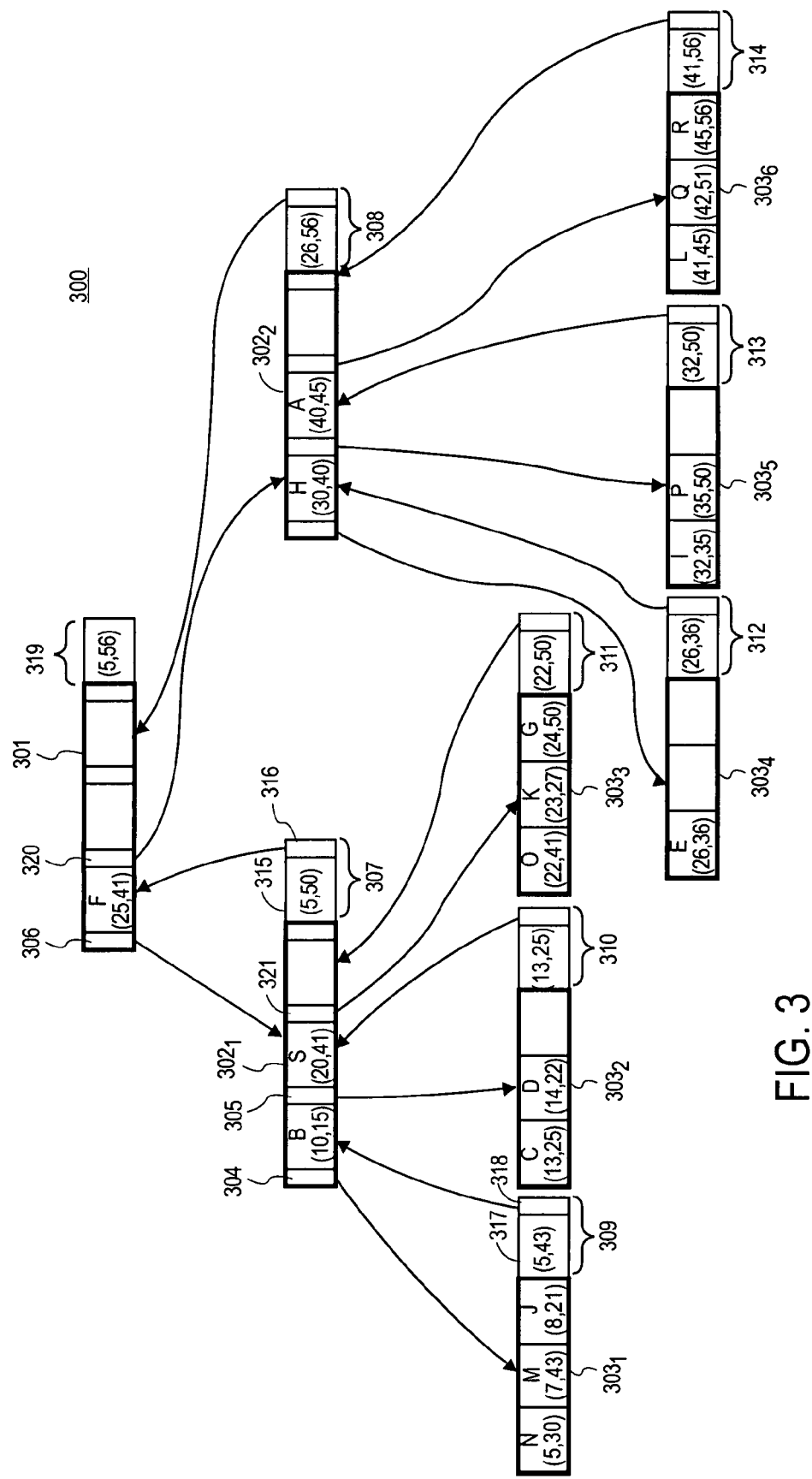
Figure 4A:
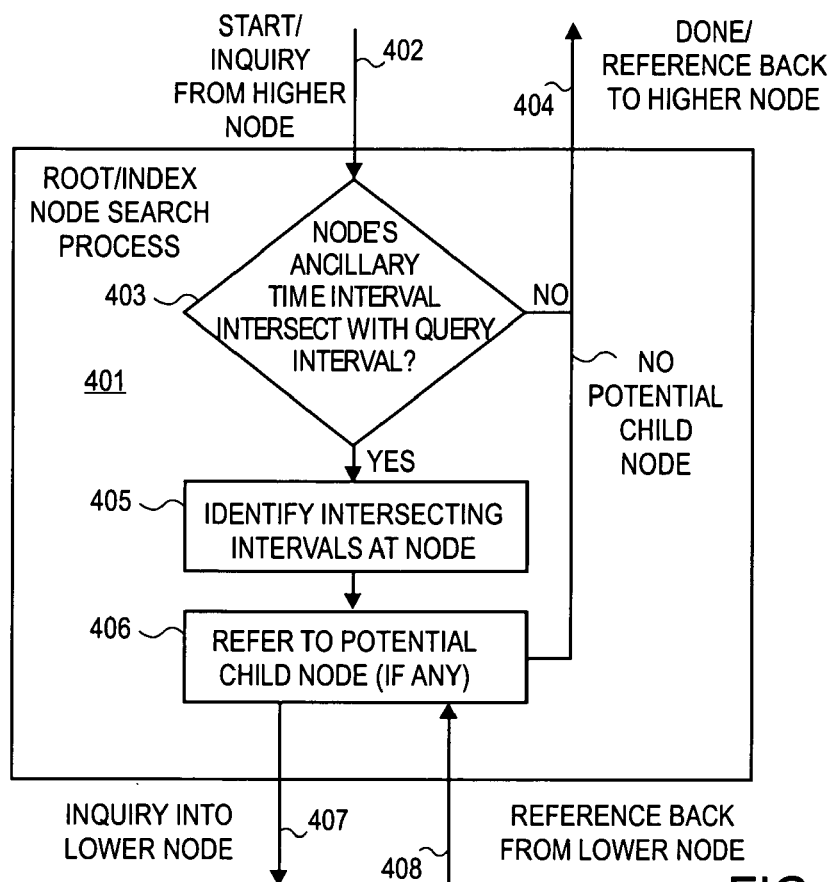
Figure 4B:
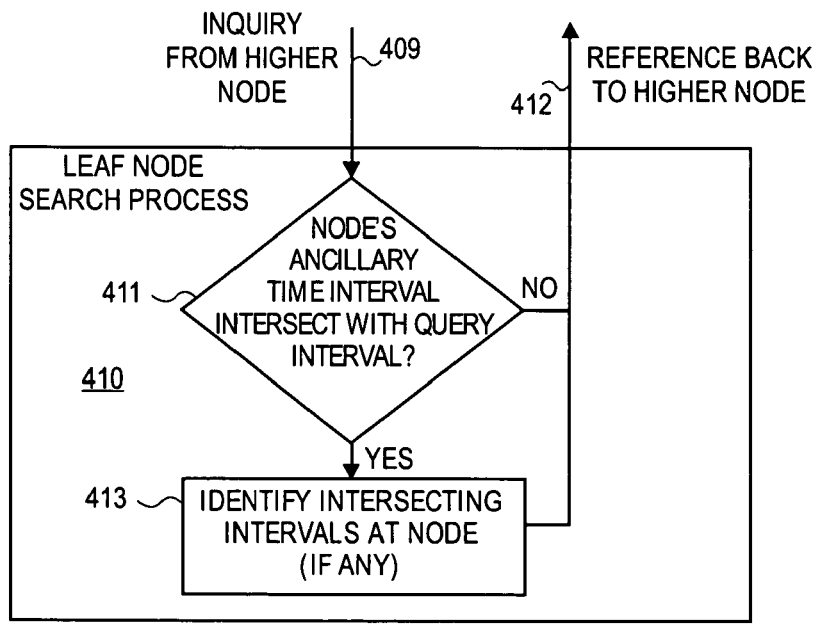
Figure 5:
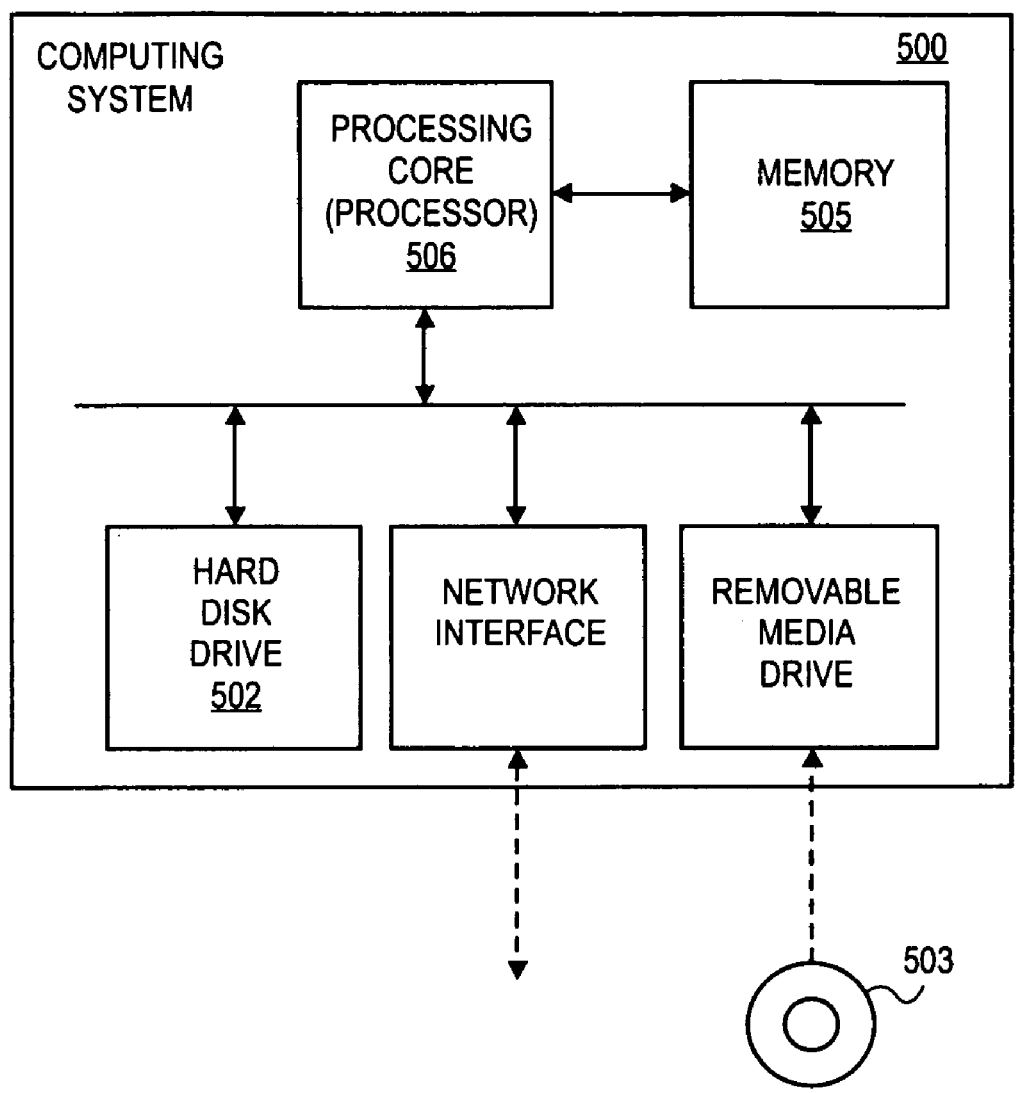

The present invention is illustrated by way of example and not limitation in the figures of the accompanying drawings, in which like references indicate similar elements and in which:

FIG. 1 shows a prior art index structure;
FIG. 2 shows a plurality of time intervals;
FIG. 3 shows a novel index structure having the intervals of FIG. 2 as its keys (i.e., a novel interval tree);
FIG. 4a shows a search methodology for a root node or index node;
FIG. 4b shows a search methodology for a leaf node;
FIG. 5 shows a computing system.

DETAILED DESCRIPTION

FIG. 2 shows a timeline of scheduled tasks A through S that may represent, for example, the amount of time different activities have been scheduled on a specific resource. For example, if the resource is a manufacturing tool, task A represents the time "job 1" has been scheduled on the tool, task B represents the time "job 2" has been scheduled on the tool, etc. From FIG. 2, "job1" is scheduled for a time period of 40 to 45 (e.g., hours) and "job2" is scheduled for time period of 10 to 15.

Often, a software application that is responsible for managing the scheduling of tasks on a particular resource desires to know information about the tasks that have been scheduled on the resource. For example, the software application may desire to know which tasks (if any) have scheduling times that overlap with a specific time interval. This desire may arise from a general inquiry into the usage that has been scheduled on a resource over the time interval; and/or, an attempt to schedule another task over the time interval.

FIG. 3 shows a index structure 300 structured to include as its keys the tasks and corresponding time intervals of FIG. 2. For simplicity, like the index structure of FIG. 1, the interval tree of FIG. 3 is a t=2 tree. Because the keys of the index structure are intervals of time, the index structure 300 of FIG. 3 may be referred to as an "interval tree". The information contained in the interval tree 300 of FIG. 3 is specially structured to support an efficient searching algorithm that identifies those keys in the tree 300 whose corresponding time interval overlaps (i.e., intersects) with a specific time interval (a "query interval").

Thus, inclusion of an interval tree designed according to the principles observed in FIG. 3 into a software application whose function includes managing the scheduling of tasks on a resource should result in the application being able to efficiently identify which tasks (if any) intersect with the query interval. It is believed that an interval tree designed according to the principles observed in FIG. 3 is capable of identifying m time intervals that intersect a particular query interval in $O((m+1)(1+\log((n+1)/(m+1))))$ where n is the total number of keys entered in the tree.

Although interval trees are known in the art, the interval tree of FIG. 3 is believed to be particularly efficient because of ancillary data that is included at each node. Specifically, each non root node includes: 1) a "span key" that identifies the end-to-end time span of the tree section that the node is the recognized apex of; 2) an identifier of its parent node to permit complete searching of the parent's node children for time intervals that intersect with the query interval. This information is observed in FIG. 3 as information segments 307, 308, 309, 310, 311, 312, 313 and 314 for non root nodes $302_1$, $302_2$, $303_1$, $303_2$, $303_3$, $303_4$, $303_5$, $303_6$, respectively. The ancillary data 319 of the tree's root node 301 includes the end-to-end time span of the entire tree.

Before discussing the relevance of this ancillary data, the information in the tree 300 of FIG. 3 will be more fully described with respect to the specific time intervals observed in FIG. 2. The interval tree of FIG. 3 sorts the time intervals of FIG. 2 based on their start times. As an over-arching perspective, as tasks are scheduled, their corresponding time intervals are entered in the tree; and, as tasks are deleted their corresponding time intervals are deleted from the tree. With continual addition and deletion of time intervals to/from the tree, the tree dynamically changes in terms of the number of nodes, the number of children nodes that stem from one or more parent nodes, and, the content of the nodes themselves.

For example, if a new interval "T" having a start time of 4 or less were to be added to the interval set of FIG. 2, the effect (according to one addition algorithm embodiment) would be to: 1) push interval M into index node $302_1$, 2) "split" leaf node $303_1$ into a pair of leaf nodes (a first having intervals T and N and space for one more interval; a second having interval J and space for two more intervals); and, 3) modify the pointers of node $302_1$, accordingly.

More extensive changes over the course of time can affect higher tree nodes including the root node. Thus, the particular nodal content and parent/child node relationships observed in FIG. 3 can simply be viewed as the resultant state after a run time of interval addition and deletion procedures.

Accordingly, at the moment of observation depicted in FIG. 3, the root node of the interval tree 300 happens to have time interval F as its only time interval entry. Note that time interval F has a start time of 25. Thus, a first pointer 306 in the root node 301 points to a sub-tree (having index node $302_1$ as its apex) that collects all intervals in FIG. 2 having a start time before 25 (i.e., time intervals B, C, D, G, J, K, M, N, O and S); and, a second pointer 320 in the root node that points to a sub-tree (having index node $302_2$ as its apex) that collects all intervals in FIG. 2 having a start time after 25 (i.e., time intervals A, E, H, I, P, Q and R).

Index node $302_1$ is the apex node of all intervals of FIG. 2 that start prior to 25. The index node $302_1$ itself includes time intervals B and S. The index node $302_1$ also includes three pointers: 1) a first pointer 304 that points to a leaf node $303_1$ that includes the intervals of FIG. 2 that start prior to the start time of interval B (i.e., 10); 2) a second pointer 305 that points to a leaf node $303_2$ that includes the intervals of FIG. 2 that start after the start time of interval B but before the start time of interval S (i.e., after 10 but before 20); 3) a third pointer 321 that points to a leaf node $303_3$ that includes the intervals of FIG. 2 that start after the start time of interval S but before the start time of interval F (i.e., after 20 but before 25).

Each of leaf nodes $303_1$, $303_2$ and $303_3$ respectively include ancillary data 309, 310, 311 that identifies its maximum end-to-end time span and the parent node $302_1$. For each leaf node, the maximum end-to-end time span is a time interval that starts at the earliest start time of its constituent time intervals and ends at the latest of its constituent time intervals. For example, the constituent time intervals for leaf node $303_1$ include time intervals N, M and J. The earliest start time amongst time intervals N, M and J is 5 (interval N) and the latest end time amongst time intervals N, M and J is 43 (interval M). Thus, the maximum end-to-end time interval 317 for leaf node $303_1$ is (5,43) which, along with the pointer 318 back to parent node $302_1$, corresponds to the ancillary data 309 observed in FIG. 3 for leaf node $303_1$. The ancillary data 310, 311 of leaf nodes $303_2$ and $303_3$ are similarly determined.

The maximum end-to-end time interval effectively captures, for each leaf node, the most pertinent information with respect to the query interval intersection question. That is, again referring to leaf node $303_1$, the maximum end-to-end time interval of (5,43) signifies that there is a "chance" a query interval "might" intersect one or more of the intervals referenced at leaf node $303_1$ (i.e., intervals N, M or J) if the query interval has at least some overlap with the (5,43) time interval.

Thus, if a query interval has some overlap with the (5,43) time interval, the specific N, M and J intervals should be compared against the query interval to see if an intersection exists; or, if a query interval does not have any overlap with the (5,43) time interval, leaf node $303_1$ can be ignored. Similarly, the specific intervals contained by leaf node $303_2$ should be compared against the query interval if the query interval overlaps with the time interval (13,25) (if not, the contents of leaf node $303_2$ can be ignored); and, the specific intervals contained by leaf node $303_3$ should be compared against the query interval if the query interval overlaps with the time interval (22,50) (if not, the contents of leaf node $303_3$ can be ignored).

Moreover, the structure of the interval tree of FIG. 3 indicates that the time interval portion of the ancillary data "bubbles up" from children nodes and merges at their common parent. Specifically, as an example, note that the maximum end-to-end time interval (5,50) 315 of the ancillary data 307 of index node $302_1$, provides the earliest start time and latest end time of all of its constituent intervals including those listed at the index node (i.e., intervals B and S) as well as those listed in each of its children nodes $303_1$ through $303_3$ (i.e., intervals N, M, J, C, D, O, K and G).

Further still, note that the time intervals in the ancillary data 312, 313 and 314 of leaf nodes $303_4$ through $303_6$ is determined similarly to that of leaf nodes $303_1$ through $303_3$ as described just above. That is, the earliest start time and latest end time amongst all the time intervals listed in a particular leaf node are identified in that leaf node's ancillary data.

Moreover, the time interval in the ancillary data 308 of index node $302_2$ identifies the earliest start time amongst all the time intervals in and beneath the index node $302_2$ (specifically, the start time 26 of time interval E and the end time 56 of time interval R).

At the root node 301, the ancillary data 319 is formatted by "bubbling up" the time intervals from ancillary data items 307, 308 and selecting the earliest start time and latest end time amongst them to form time interval (5,56). Thus, as already stated above, the structure of the interval tree of FIG. 3 indicates that the time interval portion of the ancillary data "bubbles up" from children nodes and merges at their common parent. At the root node, the earliest start time (5) of the entire interval set and the latest end time (56) of the entire interval set are presented in the ancillary data 319.

The ancillary data of the index and leaf nodes also identifies the respective parent. That is, root node 301 is identified in the ancillary data of index nodes $302_1$ and $302_2$; index node $302_1$ is identified in the ancillary data of leaf nodes $303_1$, $303_2$ and $303_3$; and, index node $302_2$ is identified in the ancillary data of leaf nodes $303_4$, $303_5$ and $303_6$. These "backward references" can be used to assist a searching algorithm that identifies time intervals that intersect a query interval. An embodiment of such a searching algorithm is described further ahead with respect to FIGS. 4a and 4b.

Before discussing FIGS. 4a and 4b a few comments regarding the implementation of the interval tree itself is warranted. Firstly, it should be understood that the interval tree of FIG. 3 having t=2 and height=3 nodes is only exemplary and that trees of any practicable value of t and height may be implemented. Moreover, although a B-tree structure is observed in FIG. 3, other index structures may be used as a basis for the tree's structure such as B*-tree, Red Black, Quad and AVL. At least the B-Tree, Red Black and AVL index structures are recognized in the art as being "balanced".

With increasing n (where n is the total number of non ancillary time intervals recorded in the tree), balanced index structures grow "horizontally" more than "vertically" resulting in tree height that scales approximately as O(log|n|). Tree height that scales as O(log|n|) can be viewed as the suppression of the tree's height in the face of increasing n; which, in turn, corresponds to suppression of the number of nodal accesses that need to be made to search from the root node to a leaf node. Here, reduction of the number nodal access in performing a search should correspond to reduced search time.

Also, although start times are used as the sorting criteria in the example of FIG. 3, end times may just as easily be used as the sorting criteria.

The interval tree itself may be stored wholly or partially within a relational database, an object-oriented database or with data file (e.g., text files (e.g., XML file, text file, or binary file). The interval tree may be obtained from its stored representations through an SQL or SQL-like command set or store and retrieve functions. Here, in order to reduce the number of database accesses needed to search through the interval tree, the information of more than one node may be represented in a single data file, XML file or binary file (e.g., information for more than one node is placed on XML page(s) found at a specific database address).

In a traditional database whose data is retrievable through an SQL or SQL-like command set, the interval tree may be represented as a table. Interval tree nodes are represented as separate table entries and each node/entry has its own unique key.

Alternatively or in combination the interval tree may be wholly or partially implemented with some form of caching (e.g., in an object-oriented environment). For example, an object used to realize a tree interval node includes pointers to the node's children as well as the node's ancillary data. In a further embodiment, there is a first class for leaf nodes and second class for index nodes. Here, caching is generally understood to mean interval tree data is located in a computing system that executes software that uses the tree's data rather than being located in a database that is remote from the computing system.

FIGS. 4a and 4b outline basic methods of a search process that may be run on an index structure having ancillary data as described above with respect to FIG. 3 for purposes of identifying time intervals indexed in the tree that intersect with a query interval. FIG. 4a shows a search methodology that can be executed at a root node or index node. FIG. 4b shows a search methodology that can be executed at a leaf node. The methodologies of FIGS. 4a and 4b will be explained by way of example in reference to the time interval set of FIG. 2 and the tree structure of FIG. 3.

As a first example, consider a query interval of (0,4). Referring to FIG. 2, a query interval of (0,4) does not intersect any of the time intervals A through S. The query interval is initially presented 402 to the root node 301 which executes process 401 of FIG. 4a. The basic analysis is whether or not the query interval intersects the time interval (5,56) presented in the root node's ancillary data 319.

A query interval of (0,4) does not intersect the ancillary time interval (5,56) at the root node 301 (i.e., the answer to inquiry 402 at the root node is "no"), therefore, no intersections are possible amongst the set of intervals A through S and the inquiry process is completed 404 with the result that there is no intersection. Essentially the same process would result for any query interval starting at 57 or later.

Here, according to one embodiment, an intersection between the query interval and an ancillary data time interval is not possible if either of the following statements are true:

$$ai_e \leq q_s \qquad \text{EQN. 1}$$

$$q_e \leq ai_s \qquad \text{EQN. 2}$$

where $ai_s$ is the start time of the ancillary data time interval and $ai_e$ is the end time of the ancillary data time interval (i.e., the ancillary data time interval is $(ai_s, ai_e)$); $q_s$ is the start time of the query interval and $q_e$ is the end time of the query interval (i.e., the query interval is $(q_s, q_e)$); and, "$\leq$" can be construed as "earlier in time than".

As another example, consider a query interval of (6,12). Reference to FIG. 2 reveals that intervals B, J, M and N intersect this query interval. Referring to FIGS. 3 and 4a, the query interval of (6,12) will be presented 402 as an input to root node 301. The ancillary data (5,56) 319 at the root node 301 indicates there is a possibility of intersection in the sub tree (i.e., the answer to inquiry 402 is "yes"). As such, any intersections with intervals references at the root node are identified 405. Here, interval F having an interval of (25,41) is referenced at the root node 301 which does not intersect the query interval.

Because pointer 306 points toward a sub-tree having interval start times earlier than 25, child node $302_1$ can be viewed as a "potential" child node. That is, there is potential for the finding of intersecting intervals within the sub tree having node $302_1$ as its apex because pointer 306 points to the tree location where time intervals having start times earlier than 25 are located and the query interval has a start time earlier than 25. As such, process 406 causes index node $302_1$ to be referred to next in the search process.

Here, process 401 can again be used, albeit with the jump from pointer 306 (i.e., the inquiry from higher root node 301) being viewed as input 402. The query interval (6,12) is compared against the time interval (5,50) stored in the ancillary data 307 of index node $302_1$. Intersection is possible from the inequalities expressed in EQNs 1 and 2. As such, the time intervals stored at node $302_1$ (i.e., intervals B, S) are reviewed 405 for intersection. Here, time interval B is identified as intersecting but time interval S is not.

Next, the first potential child node is referred to 406, 407. Leaf node $303_1$ is first identified as a potential child node because pointer 304 points to all time intervals having a start time earlier than 10; and, the query interval has a start time earlier than 10. Process 410 of FIG. 4b shows the processing that is performed at a leaf node. The leaf node's ancillary data time interval (5,43) 317 is analyzed 411 for the possibility of intersection. Intersection is possible from the inequalities expressed in EQNs 1 and 2. Thus, the time intervals of leaf node $303_1$ are investigated 413 for intersection resulting in the identification of time intervals N, M and J. Thus, at this point, time intervals B, N, M and J are identified from the searching process.

Here, reference 318 back to index node $302_1$ is used to jump back 412, 408 to the index node $302_1$ so that process 406 can be re-visited. Referring to the content of index node $302_1$, leaf node $303_2$ will register as a potential node because it contains time intervals that start earlier than 20 and the query interval starts earlier than 20. As such, pointer 305 is used to jump to 407, 409 leaf node $303_2$ so that process 410 can be executed. The ancillary data time interval (13,25) of leaf node $303_2$ is compared against the query interval.

Here, intersection is not possible because the end time of the query interval 12 is earlier than the start time of the ancillary data time interval 13 (i.e., EQN. 2 is "true"). As such, the time intervals C and D of leaf node $303_2$ are ignored and the pointer of ancillary data 310 is used to jump back 412, 408 to index node $302_1$. Reanalysis of process 406 for index node $302_1$ reveals that no more intersections are possible because the pointer 321 to leaf node $303_3$ will only provide time intervals having start times that are later than 20 which is later than the end time of the query interval 12. As such, pointer 316 is used to jump back to 404 root node 301

Analysis of process 406 at the root node 301 reveals no more intersections are possible because the sub tree stemming from pointer 306 has been fully analyzed and the sub-tree stemming from pointer 320 will only contain intervals that start after 25 which is later than the end time of the query interval. Once a logical "dead-end" is reached at the root node, the searching process is completed. Note that the searching process correctly identified the time intervals that intersect with the query interval: B, J, N and M.

Processes taught by the discussion above may be performed with program code such as machine-executable instructions which cause a machine (such as a "virtual machine", general-purpose processor or special-purpose processor) to perform certain functions. Alternatively, these functions may be performed by specific hardware components that contain hardwired logic for performing the functions, or by any combination of programmed computer components and custom hardware components.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

FIG. 5 is a block diagram of a computing system 500 that can execute program code stored by an article of manufacture. It is important to recognize that the computing system block diagram of FIG. 5 is just one of various computing system architectures. The applicable article of manufacture may include one or more fixed components (such as a hard disk drive 502 or memory 505) and/or various movable components such as a CD ROM 503, a compact disc, a magnetic tape, etc. In order to execute the program code, typically instructions of the program code are loaded into the Random Access Memory (RAM) 505; and, the processing core 506 then executes the instructions.

It is believed that processes taught by the discussion above can be practiced within various software environments such as, for example., object-oriented and non-object-oriented programming environments, Java based environments (such as a Java 2 Enterprise Edition (J2EE) environment or environments defined by other releases of the Java standard), or other environments (e.g., a .NET environment, a Windows/NT environment each provided by Microsoft Corporation).

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

The invention claimed is:

1. A method, comprising:
   scheduling a task for a software application that manages a plurality of tasks by processing program code on a processing unit to perform the following:
   performing a read operation on a cache and/or database at a region of said cache and/or database where information contained at node of an interval tree is stored, said information comprising first and second interval keys, a pointer and an interval, said first and second interval keys having corresponding first and second intervals, said pointer pointing to a lower node having lower interval keys, each of said lower interval keys having corresponding intervals that either:
      a) all start within a range between said first interval's start and said second interval's start; or,
      b) all end within a range between said first interval's end and said second interval's end;
   wherein said interval identifies the earliest start and latest end amongst all intervals having keys at or beneath said node within said interval tree;
   determining if intervals associated with interval keys of said node and/or said node's children have the potential to intersect a query interval by determining if said query interval overlaps said interval, wherein, said potential to intersect is deemed to exist if said query interval overlaps said interval;
   looking amongst said intervals for an intersection with said query interval if said potential to intersect is deemed to exist, or, referring to another node that is higher than said node within said interval tree if said potential to intersect is deemed not to exist; and, scheduling said task because other scheduled tasks do not conflict with said task over said query interval, said scheduled task recorded in a machine readable storage medium.

2. The method of claim 1 wherein said node is said interval tree's root node.

3. The method of claim 1 wherein said node is an index node within said interval tree.

4. The method of claim 1 wherein
a) above applies and said determining comprises:
   determining if said query interval starts after said latest end time;
   determining if said query interval ends before said earliest start time.

5. The method of claim 1 wherein
b) above applies.

6. The method of claim 1 wherein a child node of said node has potential to intersect said query interval, said method further comprising:
   accessing information from said child node, said child node comprising a second time interval that identifies the earliest start and latest end amongst all intervals associated with interval keys at or beneath said child node within said interval tree.

7. The method of claim 6 wherein said child node is a leaf node, said second interval identifying the earliest start and latest end amongst all intervals associated with interval keys at said leaf node within said interval tree.

8. The method of claim 7 wherein a second pointer is associated with said second interval, said second pointer pointing from said child node to said node, said method further comprising jumping from said child node to said node with said pointer.

9. The method of claim 1 wherein said interval keys' corresponding intervals correspond to activities scheduled on a resource.

10. The method of claim 9 wherein said accessing is in response to an inquiry into whether another activity can be scheduled on said resource over the course of said query interval.

11. An article of manufacture storing program code which, when processed by a machine, causes the machine to perform a method, the method comprising:
   scheduling a task for a software application that manages a plurality of tasks by processing program code on a processing unit to perform the following:
   performing a read operation on a cache and/or database at a region of said cache and/or database where information contained at node of an interval tree is stored, said information comprising first and second interval keys, a pointer and an interval, said first and second interval keys having corresponding first and second intervals, said pointer pointing to a lower node having lower interval keys, each of said lower interval keys having corresponding intervals that either:
   a) all start within a range between said first interval's start and said second interval's start; or,
   b) all end within a range between said first interval's end and said second interval's end;
   wherein said interval identifies the earliest start and latest end amongst all intervals having keys at or beneath said node within said interval tree; and,
   determining if intervals associated with interval keys of said node and/or said node's children have the potential to intersect a query interval by determining if said query interval overlaps said interval, wherein, said potential to intersect is deemed to exist if said query interval overlaps said interval;
   looking amongst said intervals for an intersection with said query interval if said potential to intersect is deemed to exist, or, referring to another node that is higher than said node within said interval tree if said potential to intersect is deemed not to exist; and,
   scheduling said task because other scheduled tasks do not conflict with said task over said query interval, said scheduled task recorded in a machine readable storage medium.

12. The article of manufacture of claim 11 wherein said node is said interval tree's root node.

13. The article of manufacture of claim 11 wherein said node is an index node within said interval tree.

14. The article of manufacture of claim 11 wherein
a) above applies and said determining comprises:
   determining if said query interval starts after said latest end time;
   determining if said query interval ends before said earliest start time.

15. The article of manufacture of claim 11 wherein
b) above applies.

16. The article of manufacture of claim 11 wherein a child node of said node has potential to intersect said query interval, said method further comprising:
   accessing information from said child node, said child node comprising a second time interval that identifies the earliest start and latest end amongst all intervals associated with interval keys at or beneath said child node within said interval tree.

17. The article of manufacture of claim 16 wherein said child node is a leaf node, said second interval identifying the earliest start and latest end amongst all intervals associated with interval keys at said leaf node within said interval tree.

18. The article of manufacture of claim 17 wherein a second pointer is associated with said second interval, said second pointer pointing from said child node to said node, said method further comprising jumping from said child node to said node with said pointer.

19. The article of manufacture of claim 11 wherein said interval keys' corresponding intervals correspond to activities scheduled on a resource.

20. The article of manufacture of claim 19 wherein said accessing is in response to an inquiry into whether another activity can be scheduled on said resource over the course of said query interval.

21. A computing system comprising:
   a processing unit;
   program code stored on a machine readable storage medium, said program code capable of being executed by said processing unit to perform a method, said method comprising:
   scheduling a task for a software application that manages a plurality of tasks by processing program code on a processing unit to perform the following:
   performing a read operation on a cache and/or database at a region of said cache and/or database where information contained at node of an interval tree is stored, said information comprising first and second interval keys, a pointer and an interval, said first and second interval keys having corresponding first and second intervals, said pointer pointing to a lower node having lower interval keys, each of said lower interval keys having corresponding intervals that either:

a) all start within a range between said first interval's start and said second interval's start; or,
  b) all end within a range between said first interval's end and said second interval's end;
wherein said interval identifies the earliest start and latest end amongst all intervals having keys at or beneath said node within said interval tree; and,
determining if intervals associated with interval keys of said node and/or said node's children have the potential to intersect a query interval by determining if said query interval overlaps said interval, wherein, said potential to intersect is deemed to exist if said query interval overlaps said interval;
looking amongst said intervals for an intersection with said query interval if said potential to intersect is deemed to exist, or, referring to another node that is higher than said node within said interval tree if said potential to intersect is deemed not to exist; and,
scheduling said task because other scheduled tasks do not conflict with said task over said query interval, said scheduled task recorded in a machine readable storage medium.

22. The computing system of claim 21 wherein said node is said interval tree's root node.

23. The computing system of claim 21 wherein said node is an index node within said interval tree.

24. The computing system of claim 21 wherein
  a) above applies and said determining comprises:
    determining if said query interval starts after said latest end time;
    determining if said query interval ends before said earliest start time.

25. The computing system of claim 21 wherein
  b) above applies.

26. The computing system of claim 21 wherein a child node of said node has potential to intersect said query interval, said method further comprising:
  accessing information from said child node, said child node comprising a second time interval that identifies the earliest start and latest end amongst all intervals associated with interval keys at or beneath said child node within said interval tree.

27. The computing system of claim 26 wherein said child node is a leaf node, said second interval identifying the earliest start and latest end amongst all intervals associated with interval keys at said leaf node within said interval tree.

28. The computing system of claim 27 wherein a second pointer is associated with said second interval, said second pointer pointing from said child node to said node, said method further comprising jumping from said child node to said node with said pointer.

29. The computing system of claim 21 wherein said interval keys' corresponding intervals correspond to activities scheduled on a resource.

30. The computing system of claim 29 wherein said accessing is in response to an inquiry into whether another activity can be scheduled on said resource over the course of said query interval.

* * * * *